United States Patent [19]
Lopez

[11] Patent Number: 6,053,296
[45] Date of Patent: Apr. 25, 2000

[54] FRICTION CLUTCH WITH WEAR TAKE-UP DEVICE, ESPECIALLY FOR MOTOR VEHICLES

[75] Inventor: Carlos Lopez, Creteil, France

[73] Assignee: Valeo, Paris, France

[21] Appl. No.: 09/194,376

[22] PCT Filed: Mar. 25, 1998

[86] PCT No.: PCT/FR98/00596

§ 371 Date: Feb. 16, 1999

§ 102(e) Date: Feb. 16, 1999

[87] PCT Pub. No.: WO98/42994

PCT Pub. Date: Oct. 1, 1998

[30] Foreign Application Priority Data

Mar. 25, 1997 [FR] France ................................ 97 03628

[51] Int. Cl.[7] ................................................ F16D 13/75
[52] U.S. Cl. .................................... 192/70.25; 192/111 A
[58] Field of Search ............................ 192/70.25, 111 A, 192/70.27, 89.23

[56] References Cited

U.S. PATENT DOCUMENTS

| 4,195,719 | 4/1980 | Corral Martinez . |
|---|---|---|
| 5,139,124 | 8/1992 | Friedmann . |
| 5,404,979 | 4/1995 | Craft et al. ............................ 192/70.25 |

FOREIGN PATENT DOCUMENTS

| 2 426 834 | 5/1979 | France . |
|---|---|---|
| 2 729 199 | 1/1995 | France . |
| 2 749 904 | 6/1996 | France . |
| 2 753 756 | 9/1996 | France . |
| 2749902 | 12/1997 | France . |
| 2164297 | 8/1972 | Germany . |
| 4111503 | 10/1991 | Germany . |
| 2022729 | 12/1979 | United Kingdom . |
| WO93/07400 | 4/1993 | WIPO . |
| WO 97/19275 | 5/1997 | WIPO . |

*Primary Examiner*—Richard M. Lorence
*Attorney, Agent, or Firm*—Liniak, Berenato, Longacre & White

[57] ABSTRACT

The disclosed clutch comprises a wear take-up device (2, 4) that includes elastic compensating elements (2), operating axially between the support (1) and the response clutch plate (3). The system further comprises a blocking mechanism (41) operated by a release (41) to allow movement of the response plate to accommodate for wear. Said compensating elements (2) exert a force greater than that of the shifter elements of the clutch.

24 Claims, 9 Drawing Sheets

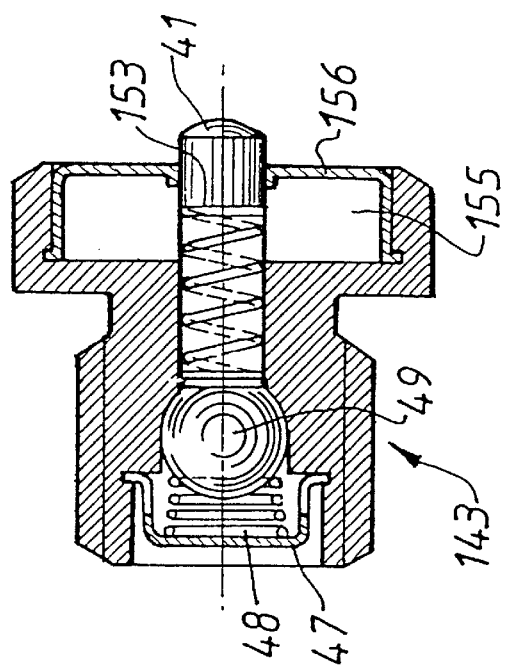
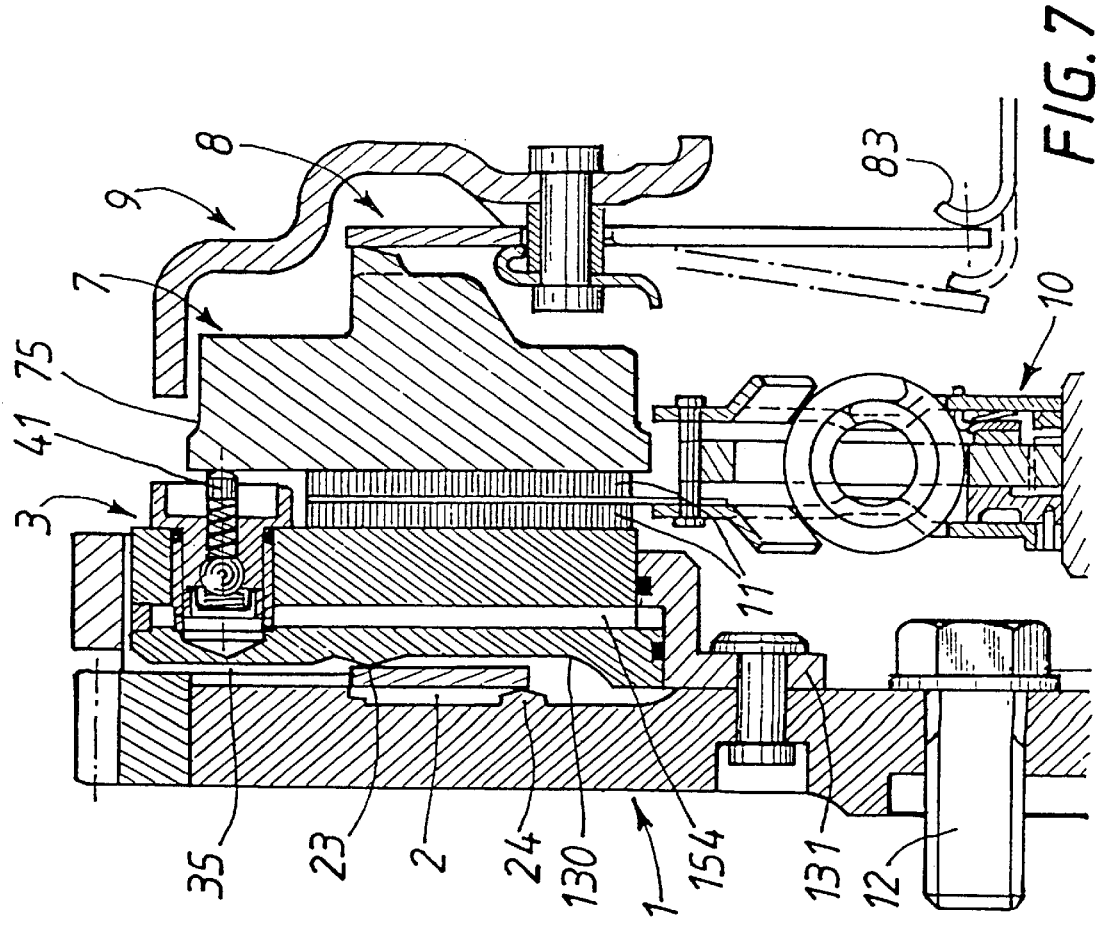

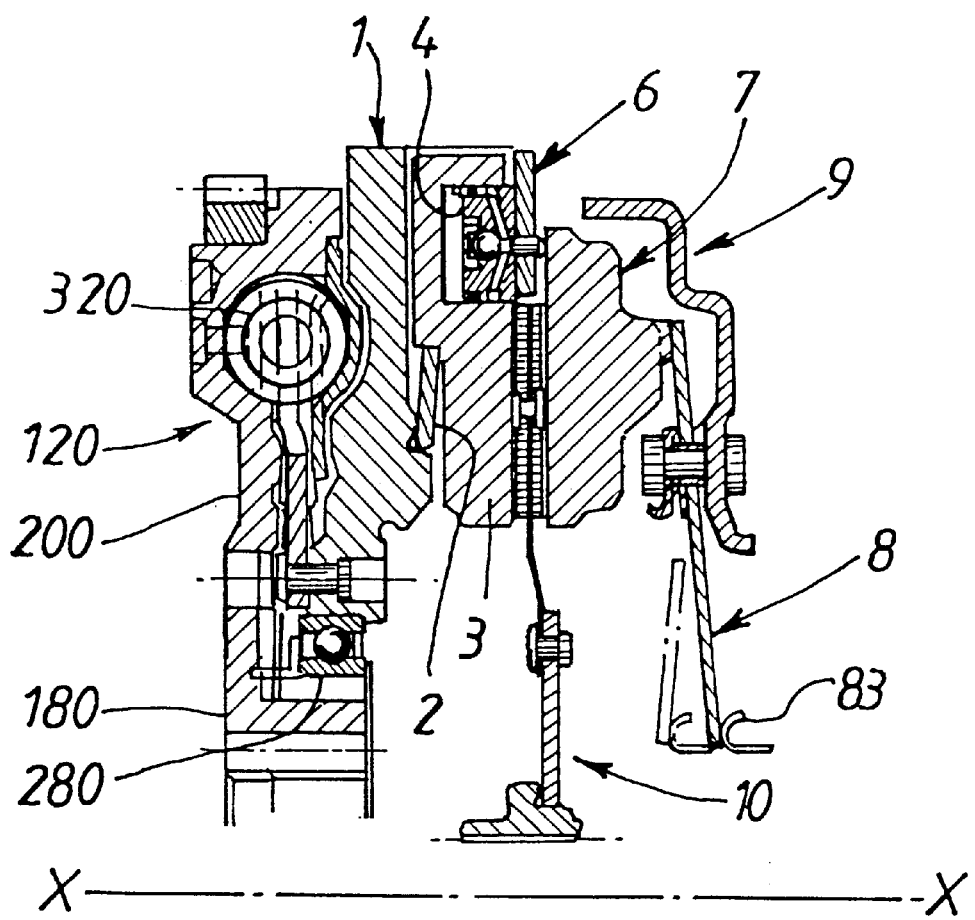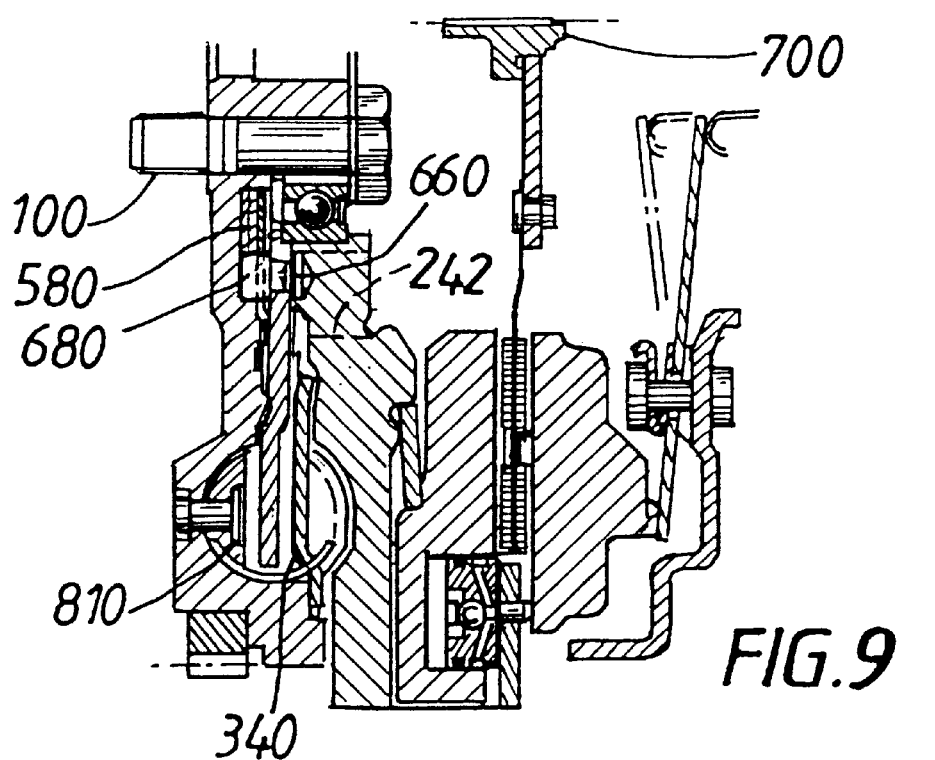
FIG.9

FRICTION CLUTCH WITH WEAR TAKE-UP DEVICE, ESPECIALLY FOR MOTOR VEHICLES

BACKGROUND OF THE INVENTION

1. Field of the Invention

The present invention concerns friction clutches, notably for motor vehicles.

It relates more particularly to friction clutches having a wear take-up device.

2. Description of the Related Art

As is known, a friction clutch has at least one friction disc provided at its external periphery with friction linings, possibly divided, intended to be clamped between a flywheel, forming a reaction plate, and a thrust plate.

The flywheel is formed so as to be connected with respect to rotation to a first shaft, whilst the friction disc is formed so as to be connected with respect to rotation to a second shaft.

In the case of an application for motor vehicles the first shaft is a driving shaft, whilst the second shaft is a driven shaft, namely the input shaft of a movement transmission box, usually the input shaft of the gearbox. The flywheel, possibly in two parts in order, for example, to form a double torsion damping flywheel, is fixed centrally to the engine crankshaft by means of fixing members, such as screws, whilst the friction disc conventionally has a central hub fluted internally in order to connect it with respect to rotation to the said input shaft. This hub is rigidly or elastically coupled to the friction linings.

The thrust plate is connected with respect to rotation, with axial freedom of movement, to the flywheel and has at its front a friction face for the friction linings, whilst the flywheel has on its back a friction face for the said linings.

Axially acting elastic means bear on a cover and act on the rear face of the thrust plate in order to clamp the friction linings between the friction faces of the flywheel and of the thrust plate.

These elastic means are therefore engagement means tending to bring the thrust plate close to the flywheel in order to clamp the friction linings.

The cover is hollow in shape and is formed at its external periphery so as to be fixed to the flywheel by means of fixing means.

These fixing means can be of any type and can consist for example of welding and/or crimping means. Usually the thrust plate forms part of a unitary assembly, referred to as a engagement mechanism, including the thrust plate, the engagement means and the cover.

This unitary assembly also includes disengagement means associated with the engagement means in order to counteract the action of the engagement means. The thrust plate is in this case connected with respect to rotation, with axial freedom of movement, to the flywheel by means of the first means of connection with respect to rotation. For example, the thrust plate has at its external periphery, projecting radially, lugs, forming tenons, engaged in grooves, forming mortises, provided axially in an axially oriented cylindrical skirt which the cover has at its external periphery. This skirt is connected, at one of its axial ends, to a base with a central hole and oriented transversely. The base is directed radially inwards. At its other axial end, the skirt is fixed to the flywheel by means of the aforementioned fixing means. Thus the thrust plate is connected with respect to rotation by means of a connection through cooperation of shape of the mortise and tenon type.

Conventionally, the means of connecting with respect to rotation, with axial freedom of movement, consist of elastic tongues elongated circumferentially in the form of an arc of a circle or of tangential orientation. These tongues, distributed in several groups of one or more superimposed tongues, are fixed at one of their ends to the thrust plate, for example to radial lugs thereon, and at the other end to the cover, for example to a radial area thereon.

The tongues constitute return means and provide return of the thrust plate in the direction of the base of the cover in order to disengage the clutch, that is to say to release the friction linings of the friction disc so that they do not come to brush against the friction faces of the flywheel and of the thrust plate.

The engagement means can consist of a plurality of coil springs or an axially acting elastic washer of the Belleville washer type, whilst the disengagement means can consist of a plurality of disengagement levers acting on the Belleville washer in order to modify, in a controlled fashion, the clamping action exerted directly or indirectly by this Belleville washer on the thrust plate. Usually the engagement and disengagement means belong to one and the same part referred to as a diaphragm, having a peripheral part, in the form of a Belleville washer, extended radially inwards by a central part divided into radial fingers by slots. The radial fingers form the disengagement levers and therefore the disengagement means, whilst the axially acting Belleville washer forms the engagement means. As a variant, the disengagement means, can consist of a false diaphragm, that is to say a diaphragm whose peripheral part exerts a low, or even nil, elastic load. This can be produced by providing this peripheral part with radial slots. The false diaphragm can act on one or for example two Belleville washers mounted in series.

Whatever the case, by acting, by drawing or pushing, using a clutch release bearing on the inner end of the disengagement means, the said disengagement means are caused to pivot or tilt so that they act on the engagement means in order to reduce, and then to cancel out, the clamping load (the force) exerted by the said engagement means on the thrust plate. The friction linings are then no longer clamped between the thrust plate and the flywheel, so that the torque is no longer transmitted from the first shaft to the second shaft.

It should be noted that the elastic tongues, through their return action, separate the thrust plate from the friction linings in order to release the latter. The clutch is then disengaged or declutched. Normally the friction linings are clamped as mentioned above by virtue of the engagement means. The clutch is therefore normally engaged.

During the service life of the clutch the friction linings of the friction disc and to a lesser extent the friction faces of the flywheel and of the thrust plate wear. As a result the thrust plate moves closer to the flywheel. In the clutch engaged position, the load exerted by the engagement means therefore varies with the said wear.

The same usually applies to the position of the inner end of the disengagement means on which the clutch release bearing acts.

In order to prevent this, it has already been proposed to provide the friction clutch with a device for compensating for the wear notably on the friction linings and friction faces. This device, hereinafter referred to as the wear take-up device, makes it possible, for example in the case of a friction clutch provided with a diaphragm, to have, during the service life of the friction clutch, for the clutch engaged position, roughly the same position for the inner end of the diaphragm fingers and a roughly identical load exerted by the diaphragm on the thrust plate and friction linings.

The characteristic curve of the clutch release bearing remains roughly identical (the load exerted on the inner end of the diaphragm fingers according to the travel).

To do this, the wear take-up device has ramp means carried partly by a first piece fixed with respect to rotation and movable axially and partly by a second piece movable with respect to rotation and fixed axially. There is also provided a release sensitive to the state of wear at least of the friction linings in order to control the relative movement between the said pieces.

Usually the first piece is formed by the main part of the thrust plate and the second piece by the support offered by the thrust plate to the engagement means. For more information reference should be made to the document FR-A-2 426 834.

Normally (with the clutch in the engaged position) the second piece is clamped between the main part of the thrust plate and the engagement means, such as the Belleville washer of the diaphragm.

No rotation of this second piece is therefore possible. In the case of wear notably on the friction linings the release, sensitive to the variation in position of the thrust plate following the wear on the friction linings, makes it possible to release the second piece, which thus can turn during the disengagement manoeuvre of the clutch or when the clutch is in the disengaged position because the load exerted by the engagement means is small or nil. Wear on the friction linings therefore gives rise to an increase in the thickness of the thrust plate between its friction face and the support which it offers to the engagement means.

As a result the thrust plate is modified. To avoid modifying the thrust plate, it can be thought of adopting a solution described in the document FR-A-2 722 852 (FIGS. 1 to 6).

This solution results in locating the ramp means within the flywheel and in two parts.

One of the parts is in the form of a thrust plate offering a friction face for the friction lining concerned, whilst the other part consists of a support, transversely oriented, formed so as to be fixed to the first shaft.

Second means of connecting with respect of rotation, allowing an axial movement, act between the reaction plate and the support so that the said plate can move axially.

The reaction plate is shaped so as to carry, at its internal periphery, a part of the ramp means, whilst the support rotatably carries the other part of the ramp means in association with circumferentially acting locking means.

It may be desirable to simplify this type of solution to have a more certain and more reliable functioning of the wear take-up device.

The object of the present invention is to meet this requirement economically.

Therefore an aim of the invention is to create a friction clutch provided with a thrust plate of simple form, whilst simplifying the wear take-up device acting between the two parts of the flywheel.

Another aim of the invention is to make the functioning of the wear take-up device more certain and reliable whilst simplifying the said device.

SUMMARY OF THE INVENTION

According to the invention a clutch of the type indicated above, having a support formed so as to be fixed to a first shaft, and a reaction plate connected with respect to rotation to the support by second means of connecting with respect to rotation allowing an axial movement of the reaction plate with respect to the support is characterised in that the wear take-up device has on the one hand axially acting elastic compensation means acting between the support and the reaction plate and on the other hand a releasable axially acting locking device carried by the reaction plate, in that the release acts on the locking device so as, in the event of wear on the friction linings, to release the said locking device and allow a movement of the reaction plate in the direction of the thrust plate in order to compensate for the said wear and in that the elastic compensation means exert a force on the reaction plate greater than the force exerted by the engagement means on the thrust plate.

By virtue of the invention the thrust plate has a simple form, just like the wear take-up device, which has no circumferentially acting locking means or ramp means. It is therefore possible to equip the friction clutch with a conventional engagement mechanism.

The absence of ramp means makes the wear take-up device more certain and more reliable since the risks of jamming due to the ramp means are eliminated. The reaction plate is therefore simplified since it has no ramp means. This reaction plate can be in the image of the thrust plate, that is to say similar to the thrust plate, and have lugs at its external periphery in order to carry at least one axially acting releasable locking device. The machining of the reaction plate and of the support are simplified.

In this way space is released at the internal periphery of the reaction plate and of the support in the form of a plate, or as a variant in the form of a disc, carrying a ring.

As a result the hub of the friction disc can enter inside the reaction plate, which is favourable to reducing the axial bulk. The support is also simplified since the axially acting elastic compensation means act axially between the support and the reaction plate and opposingly with respect to the engagement means when the locking device is released.

These elastic means consist economically of a Belleville washer or as a variant a diaphragm bearing on the one hand at its external periphery on a first protrusion forming part of the front face of the reaction plate turned towards the support, and on the other hand at its internal periphery on a second projection carried by the support and directed towards the reaction plate.

The first protrusion can be located on roughly the same mean circumference as a support, in the form of a protrusion, which the rear face of the thrust plate offers at the external periphery of the Belleville washer of a diaphragm, whilst the second protrusion is located roughly on the same mean circumference as primary and secondary support carried by the cover for pivoting mounting of the internal periphery of the Belleville washer of the diaphragm between the said supports.

Thus the compensation Belleville washer acts opposingly with respect to the diaphragm, the Belleville washer part of which constitutes the engagement means, and this precisely and in a perfectly controlled fashion.

This is because on the one hand the load of this Belleville washer is well controlled and on the other hand, by virtue of the location of the protrusions, this Belleville washer acts geometrically in an opposing fashion with respect to the diaphragm.

The axially acting releasable locking device is of the linear freewheel type and acts in a certain and reliable fashion.

This device can have two parts in a cylinder/piston relationship defining between them a chamber filled with grease or any other viscous agent. The piston carries at its centre the release in the form of a rod acting on a valve whose seat is formed at the front end of the piston hollowed out for this purpose.

The valve is normally closed so that normally the reaction plate cannot move axially in the direction of the thrust plate and base of the cover. The piston is in abutment against a part fixed to the support.

Thus normally the reaction plate cannot move and the elastic compensation means do not exert any load on the thrust plate and engagement means.

The clamping force exerted by the engagement means on the friction linings cannot axially move the reaction plate in the direction of the support because of the greater force exerted by the compensation means on the reaction plate. This loading of the compensating means is easy and controlled when it is a case of a Belleville washer.

In the event of wear the thrust plate or diaphragm act on the release in order to cause the latter to withdraw in the direction of the support.

The valve, in the clutch engaged position, opens so that the reaction plate can move axially in the direction of the base of the cover so as to compensate for the wear on the said friction linings.

The movement of the reaction plate gives rise, via the friction linings, to a movement of the thrust plate towards the cover and so that the release follows the movement and the valve closes again. The thrust plate resumes its initial position.

This is achieved in a continuous, automatic and certain fashion since, during the disengagement operation, the thrust plate and/or reaction plate no longer exert any load on the release so that the valve closes again in a certain fashion under the action of the thrust exerted by the grease, and under the action of a return spring.

Thus a linear freewheel is created. Other types of linear freewheels can be envisaged, for example as described in the document FR-A-2 426 834.

The wear take-up device is therefore simple in form, whilst operating in a certain and reliable fashion.

The cylinder is pushed by a shoulder fixed to the reaction plate.

Advantageously the piston bears, through its rear face, on a ring fixed to the reaction plate.

This ring makes it possible to stiffen the support and to form a manipulatable and transportable unitary sub-assembly consisting of support, reaction plate and wear take-up device, which can form part of a double torsion damping flywheel.

In general terms, the elastic compensation means have a characteristic curve similar to that of the engagement means whilst being whilst being offset with respect to it. The engagement and disengagement means can have any form. The clutch can be of the pushed or pulled type.

The support can form part of the second mass of a double torsion damping flywheel, of the type with circumferentially acting elastic members, as described in the document FR-A-2 729 199, or of the type with radially acting elastic members as described in the document FR-A-2 749 904.

Thus a double torsion damping flywheel is created, provided within it with a wear take-up device comprising the support, the reaction plate, the elastic compensation means, the locking device and the release according to the invention.

This design therefore makes it possible to mount a conventional engagement mechanism on a double torsion damping flywheel, whose second mass is equipped with a wear take-up device.

The first mass of the double torsion damping flywheel remains unchanged. The second mass thereof is not modified profoundly since that amounts to changing the conventional reaction plate of the second mass by the support plate according to the invention.

The flywheel according to the invention can therefore form part of the second mass of a double torsion damping flywheel and have within it a wear take-up device. In this case, the support is less hot than a reaction plate so that the bearing means acting between the two masses are less hot.

Other characteristics and advantages will emerge in the light of the following description and with regard to the accompanying drawings, in which:

BRIEF DESCRIPTION OF THE DRAWINGS

FIG. 7 is a view similar to FIG. 1 for another variant;

FIG. 8 is a view similar to FIG. 4 for this other variant;

FIG. 9 is a view in axial section of a friction clutch according to the invention, equipped with a double torsion damping flywheel with circumferentially acting elastic members;

For reasons of simplicity, in the figures all the common elements will be allocated the same reference numerals.

DETAILED DESCRIPTION OF THE PREFERRED EMBODIMENTS

Figure 4:
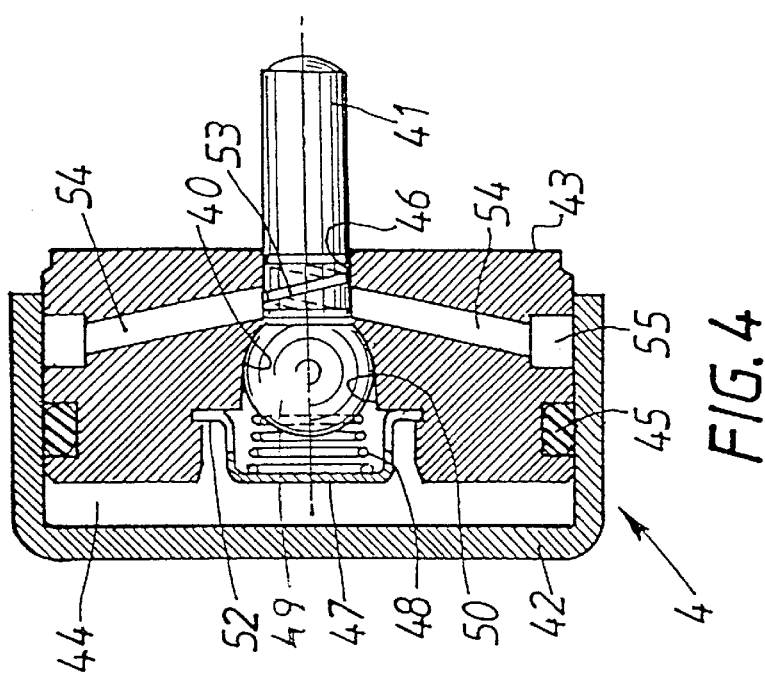
FIG. 4 is a view in axial section, to a larger scale, of the locking device of FIG. 1.

In these figures the friction clutch has, in a known fashion, a reaction plate 3, a thrust plate 7 and a friction disc 10 provided at its external periphery with friction linings 11 intended to be clamped, when the clutch is engaged, between the facing friction faces 31, 21, which are respectively on the rear of the reaction plate 3 and on the front of the thrust plate 7, both for example made of cast iron.

This clamping of the friction linings 11 is effected here by axially acting elastic means 81, forming engagement means, acting between the rear face of the thrust plate 7 and the transversely oriented base 90, with a central hole, of a hollow-shaped annular cover 9 shaped at its external periphery so as to be fixed to a support plate 1 as described below. In the figures, the plate 1 is made of castable material, here cast iron.

The cover 9 is here made from pressed sheet metal, or as a variant cast iron, and the plate 1 cast iron or as a variant steel. The transversely oriented base 90 is directed radially inwards.

This support plate 1 is shaped at its internal periphery so as to be fixed directly (FIGS. 1 to 8) or indirectly (FIGS. 9 to 12) to a first shaft, whilst the friction disc 10 is shaped at its internal periphery so as to be connected with respect to rotation to a second shaft. The support plate 1 is fixed axially and, when the first shaft turns, rotates about the axial symmetry axis X-X (FIGS. 9 to 12) of the friction clutch.

In the figures illustrated, the friction clutch is intended to equip a motor vehicle so that the support plate 1 is intended to be connected with respect to rotation rigidly (FIGS. 1 to 8) or elastically (FIGS. 9 to 12) to the motor vehicle crankshaft, constituting the first shaft, whilst the second shaft is the gearbox input shaft. For reasons of simplicity and clarity these shafts have not been shown, nor the internally fluted hub which the friction disc has at its internal periphery for connecting it with respect to rotation to the gearbox input shaft, as can be seen in the document U.S. Pat. No. 4,195,719.

Here the hub is connected elastically to the friction linings 11. For this reason it can be seen (FIG. 1) that the friction linings 11 are fixed on each side of the support disc fixed by ties to guidance washers and disposed of each side of a web connected to the hub.

The clutch also has disengagement means 82 associated with the engagement means 81 for action on the engagement means 81 and cancellation (release) of the force exerted by the engagement means 81 on the thrust plate 7 in order to clamp the friction linings 11 between the plates 3, 7.

Figure 1:
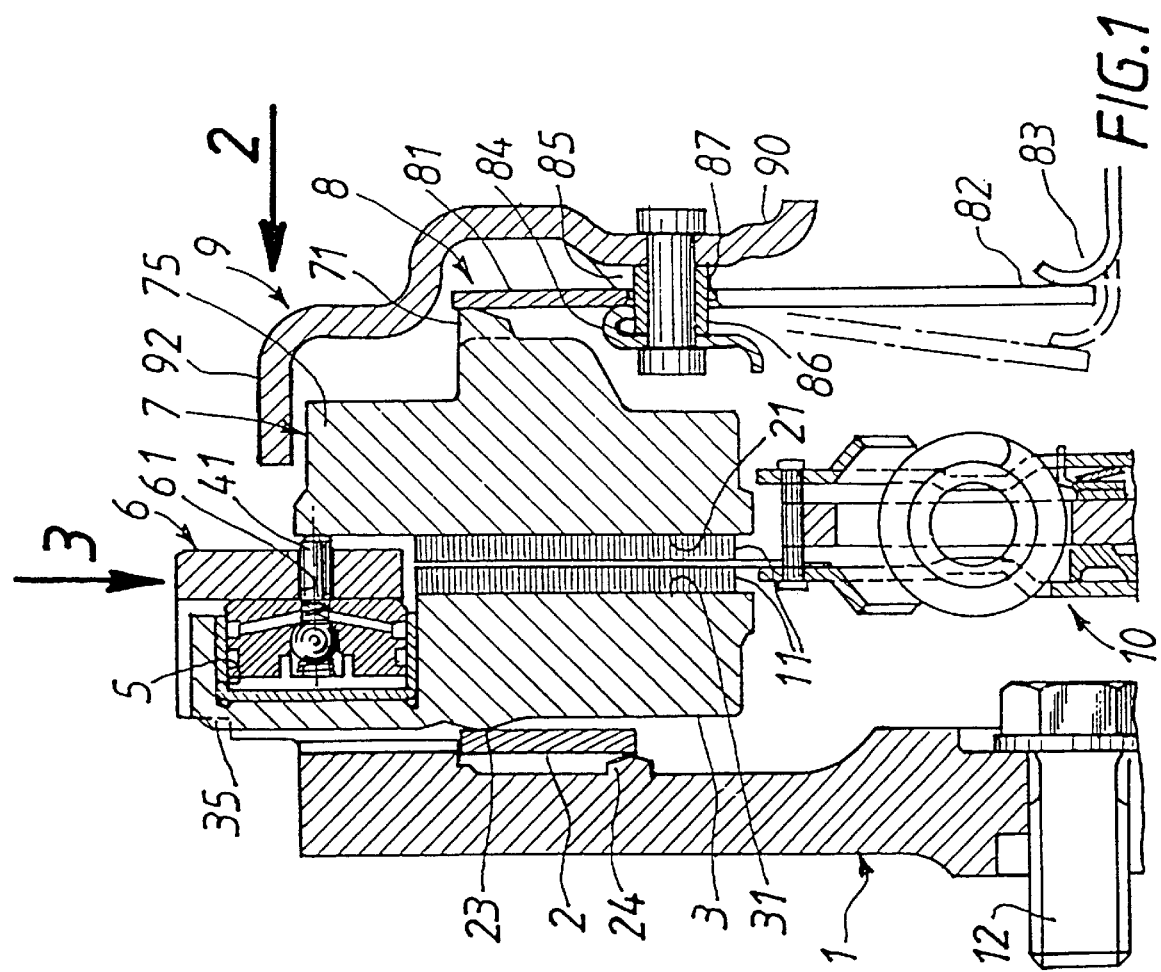
FIG. 1 is a partial half-view in axial section of a friction clutch according to the invention.
Figure 2:
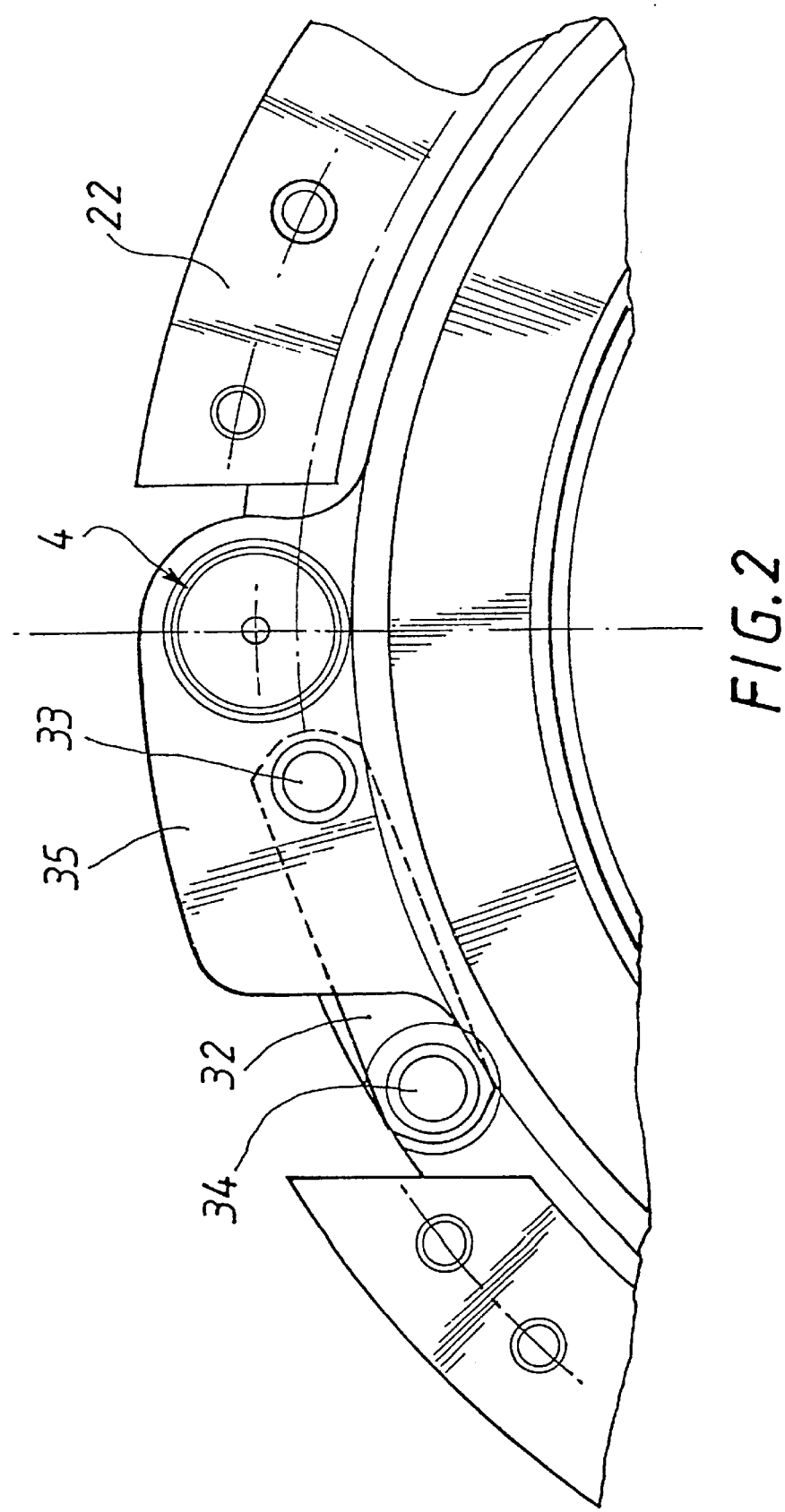
FIG. 2 is a view in the direction of the arrow 1 in FIG. 1 without the engagement mechanism and the ring.

This is achieved in a controlled fashion, by means of a clutch release bearing 83, depicted partially in FIG. 1, acting here by pushing on the inner end of the disengagement means 82. It can be seen in dotted lines that the disengagement means 82 tilt when the bearing 83 moves axially towards the left in FIG. 1. This tilting also gives rise to a tilting of the engagement means 81.

As is known, the clutch release bearing is carried by the gearbox whilst being mounted so as to slide along a guide tube (not shown) carried by the said box and with the input shaft passing through it.

More precisely, here the engagement 81 and disengagement 82 means form part of the same piece 8, with a central hole. This piece 8 is a diaphragm of annular shape.

In the free state the diaphragm 8 has a frustoconical shape and undergoes mechanical and heat treatment operations in order to give it the required shape and elasticity. This diaphragm 8 has a peripheral part 81 in the form of a Belleville washer extended radially inwards by a central part divided into radial fingers 82 by slots opening out internally in the central opening in the diaphragm externally, in the vicinity of the internal periphery of the Belleville washer 81, in a broadened orifice 87. The slots are therefore blind.

As will have been understood the engagement means consist of the Belleville washer 81 and the disengagement means of the fingers 82 forming disengagement levers.

Figure 6:
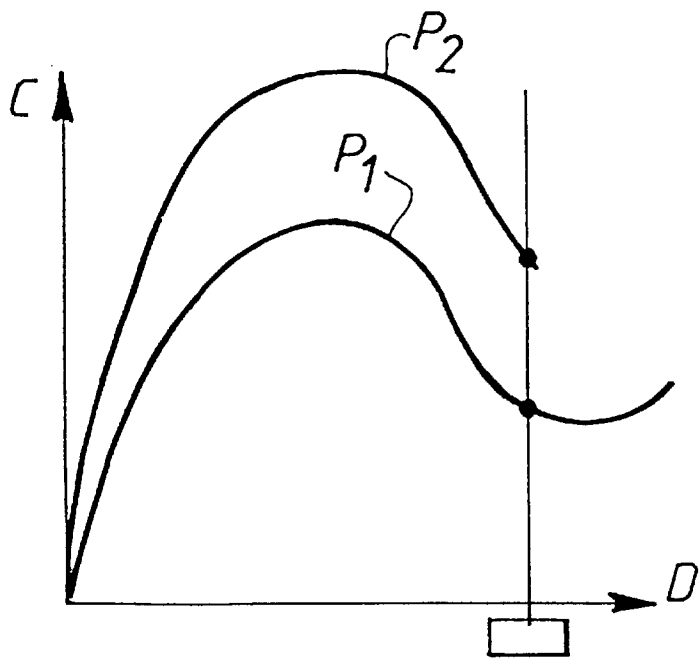
FIG. 6 depicts the characteristic curves P1 and P2 respectively of the diaphragm and of the elastic compensation washer with the loads (or forces exerted) on the Y axis and the deflections on the X axis.

In a known fashion, the characteristic curve of the diaphragm 8 (force exerted—as a function of the deflection) depends on its thickness and on the height of its truncated cone and is visible at P1 in FIG. 6 in which on the X axis the deflection (D) has been shown and on the Y axis the load exerted (C). This curve increases up to a maximum, and then decreases in order once again to increase.

Here the diaphragm 8 is mounted pivotally between a primary support 85 and a secondary support 84 carried by the cover 9.

In the clutch engaged position the diaphragm 8 bears through the internal periphery of its Belleville washer 81 on the primary support 85 and through the external periphery of its Belleville washer 81 on an annular protrusion 71, here divided into annular sectors, carried in axial projection by the rear face of the thrust plate. The protrusion 71 is directed towards the base 90 of the cover 9. Thus the diaphragm 8 normally exerts a clamping action on the friction linings 11 in order to clamp them between the faces 31, 21.

In the clutch disengaged position the diaphragm 8 bears on the secondary support 84. This change in bearing is achieved in a controlled fashion by means of the clutch release bearing 83, which acts by pushing on the inner end of the fingers 82 of the diaphragm 8. During the manoeuvre (disengagement of the clutch) the diaphragm 8 tilts. Here the primary support 85 is produced by pressing the base 90 of the cover 9.

As a variant it can consist of a spring ring. The same applies to the secondary support 84, which is carried here by small columns 86.

As a variant the secondary support can consist of the heads of the small columns 86 profiled accordingly, knowing that the diaphragm 8 is interposed between the primary 85 and secondary 84 supports facing each other.

In the figures the small columns 86 are in two parts and each have a rivet passing through a sleeve engaged in a broadened orifice 87 in the diaphragm 8. The secondary support 84 consists of a rolled ring, interposed between the head of each rivet and the facing end of the sleeve, as described in the aforementioned document U.S. Pat. No. 4,195,719, to which reference should be made for more information.

This document also shows other embodiments which can be envisaged for mounting the secondary support 84 on the cover 8. As a variant, this secondary support can be carried by lugs issuing by cutting and bending from the base 90 of the cover 9, the said lugs each pass through a broadened orifice 87 and are folded down radially outwards at their free end, in order to form a wedging elbow for a frustoconical ring whose outer edge is rounded in order to form the secondary support 84.

In all cases assembly means are provided for tilting mounting of the diaphragm 8 on the cover 9. These means include the primary support 85, the secondary support 84 and the small columns 86 riveted on the base 90 or the aforementioned lugs.

The first means of connecting with respect to rotation 72 are provided for connecting the thrust plate 7 to the cover 9 with respect to rotation with possibility of axial movement. These means consist here of elastic tongues 72 distributed in several sets, the number of which depends on the application. One or more superimposed tongues can be provided for each set.

These tongues 72 are here oriented tangentially and are fixed at one of their ends each by a rivet 73 to a circumferentially elongated lug 75 which the thrust plate 7 has, projecting radially outwards, at its external periphery.

At their other end the tongues 72 are fixed by riveting at 74 to the cover 9. More precisely the rivet 74 is extended so as to form a small column whose head forms a stop able to cooperate with a circumferential projection 76 which the lug 75 has at one of its circumferential ends.

The base 90 of the cover is extended at its external periphery by an axially oriented cylindrical skirt 92. This skirt 92 is scalloped locally and is extended at its free end by a transverse flange 93, 94 directed radially outwards.

It is by means of this flange 93, 94 that the cover 9 is, according to one characteristic, fixed at its external periphery to the support plate 1 by means of fixing means 77 with the interposition of a closure ring 6 between the flange 93, 94 and the external periphery of the plate 1. The cover 9 here surrounds the diaphragm 8 and thrust plate 7.

The fixing means consists here of a plurality of screws 77 whose head bears on a radial fixing surface 93 on the flange 93, 94 and passes through the said surface and the ring 6 in order to be screwed into the support plate 1. Centring studs 78 carried by the support plate 1 are provided for centring the flange 93, 94 and the ring 6. The studs 78 therefore pass through axially coinciding holes formed in the ring 6 and the surfaces 93.

Here the flange 93, 94 has (FIG. 3) two series are axially offset surfaces 93, 94. The aforementioned surfaces 93 serve for fixing the cover 9 to the support plate 1, whilst the surfaces 94, closer axially to the base 90, serve for fixing the tongues 72 by means of the small columns 74.

Figure 3:
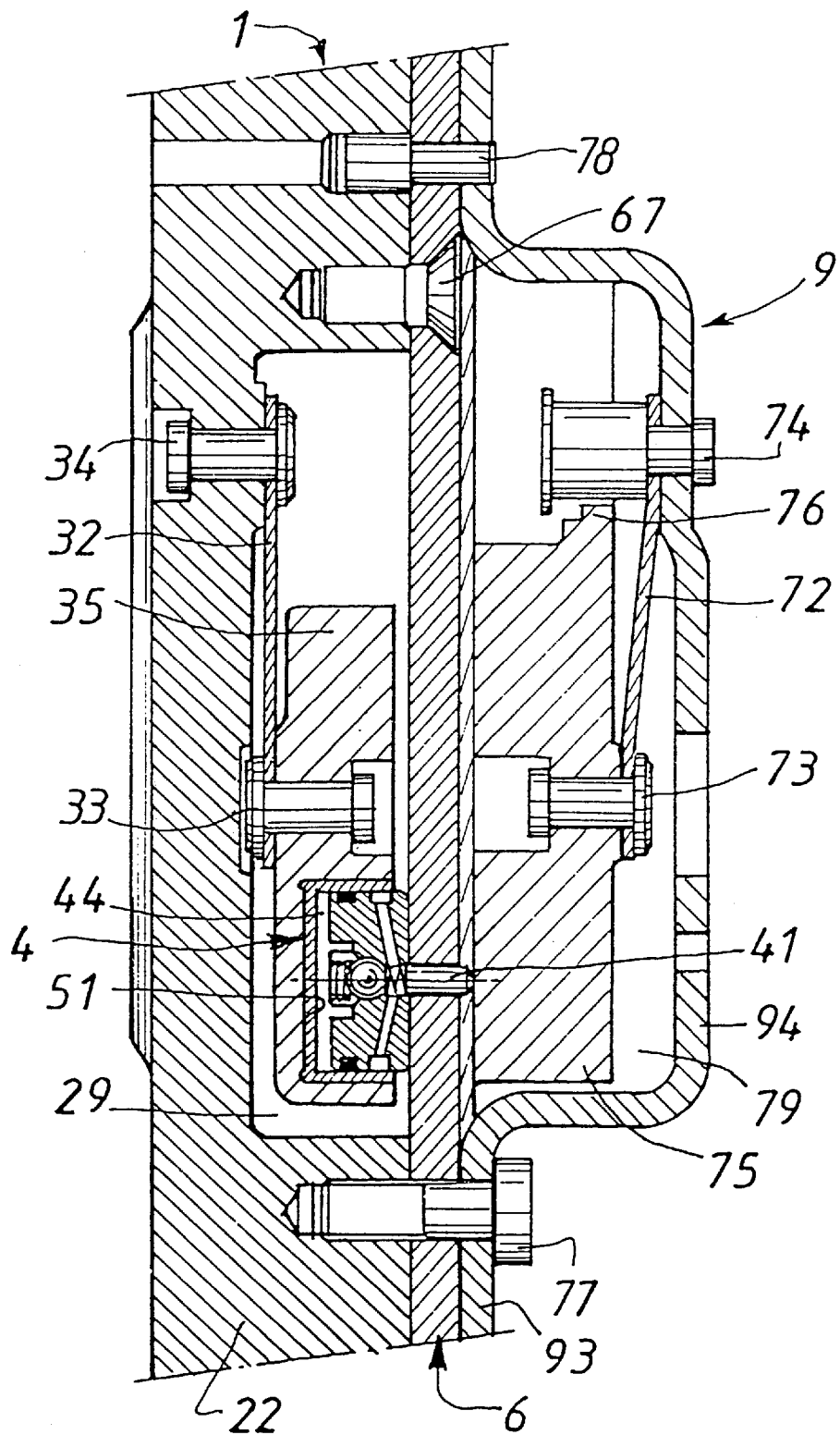
FIG. 3 is a view in the direction of the arrow 3 in FIG. 1.

As can be seen in FIG. 3, two consecutive surfaces 93 are connected together by a surface 94 in order to define a first scallop 79 allowing passage of a lug 75 on the thrust plate.

Here each surface 94 has a hole for riveting the tangential tongues 72 to the lugs 73 of the thrust plate 7.

In a known fashion, these elastic tongues 72 form elastic return means exerting an elastic return action on the thrust plate 7 in the direction of the base 90 of the cover and thus affording, when the clutch is disengaged, good release of the friction linings 11.

As will have been understood, the cover 9, the diaphragm 8 and the thrust plate 7 form, by virtue of the tongues 72, a unitary assembly known as the engagement mechanism, the small column 74 limiting the outward movement of the thrust plate 7 by cooperation with the projections 76 when the engagement mechanism is notably in the storage position, that is to say not fixed by means of its cover to the support plate 1. The tongues 72 are thus optimised.

Thus, before this fixing, the projections 76 are in abutment against the heads of the small columns 74. Here three sets of tongues 72 are provided, distributed at 120° with respect to each other. This number depends on the application.

The same applies to the number of scallops 79, hereinafter referred to as first scallops, and on the number of fixing members 77 and centring studs 78, knowing that the screws 77 can be replaced by rivets, bolts etc.

It should be noted that the plate 1, in the embodiments in FIGS. 1 to 8, has openings at its centre, one of which, not referenced, can be seen in FIG. 1. These openings can have screws 12 pass through them, allowing the direct fixing of the plate 1, here to the crankshaft, so that this plate 1 is shaped at its internal periphery so as to be fixed to a first shaft. The plate 1 is therefore fixed axially and turns with the vehicle engine. In FIGS. 9 to 12, the support plate 1 is fixed axially and is shaped at its internal periphery so as to be connected elastically to a first mass 120 intended to fixed to the first shaft.

The plate 1 is thickened at its external periphery to form an axially oriented annular peripheral flange 22. This flange 22 is here threaded and is drilled for mounting screws 77 and centring studs 78, as well as for mounting countersunk-head screws 67 enabling the ring 6 to be fixed to the free end of the flange 22. Opposite the peripheral scallops 79 the flange 22 has second scallops 29, as can be seen better in FIG. 3.

These second scallops 29 serve as a housing for lugs 35 projecting radially outwards and issuing from the external periphery of the reaction plate 3 made from castable material.

The support plate 1 and thrust plate 7 are also made from castable material.

The ring 6 stiffens the flange 22 by forming a bridge closing off the second scallops 29. The ring 6 also stiffens the flange 93, 94 on the cover 9 by closing off the first scallops 79. This ring 6 forms a partition separating the facing scallops 29, 79.

It should be noted that the first scallops 79 are longer circumferentially than the second scallops 29.

According to one characteristic the reaction plate 3 is connected with respect to rotation to the support plate 1 with axial freedom of movement. To do this, second means of connecting with respect to rotation 32, with axial freedom of movement, act between the support plate 1 and reaction plate 3.

According to one characteristic the second means of connecting with respect to rotation 32 are in the image of the first means of connecting with respect to rotation 72 and therefore consist of tangentially oriented elastic tongues 32. These tongues 32 form second elastic return means and are fixed at one of their ends to the support plate 1 and at their other end to the circumferentially elongated lug 35 on the reaction plate 3. As with the tongues 72, the tongues 32 are fixed to the plate 1 and to the lugs 35 by means of fixing members, here rivets respectively 34, 33.

Naturally the tongues 32 are distributed in several sets of tongues, here superimposed.

The number of sets of tongues 32 is here identical to the number of tongues 72.

As a variant, the elastic tongues 32, 72 can be in the form of an arc of a circle. As a variant, the tongues 32, 72 can be radially oriented.

It should be noted that the rivets 33, 73 are roughly facing each other (FIG. 3). The same applies to the rivets 34, 74.

As will have been understood, the reaction plate 3 is in the image of the thrust plate 7, and a sub-assembly consisting of the support plate 1 and reaction plate 3 is formed by virtue of the tongues 32. The ring 6 also forms part of this sub-assembly.

The friction clutch according to the invention therefore has a flywheel in two parts, namely a reaction plate 3, offering at its rear a friction face 31 for the friction disc 10, and a transversely oriented support plate 1. This flywheel can be fixed directly to the vehicle engine crankshaft (FIGS. 1 to 8) or be fixed indirectly to the said crankshaft (FIGS. 9 to 12).

According to one characteristic of the invention, a wear take-up device 2, 4 is mounted within the flywheel 1, 3. This device notably compensates for the wear due to the friction linings 11 and, to a lesser extent, due to the friction faces 21, 31. When the said linings 11 wear, the thrust plate 7 moves closer to the reaction plate 3 so that the position of the diaphragm varies when the clutch is engaged.

The object of the wear take-up device is to compensate for the wear and to keep the position of the diaphragm 8 substantially constant when the clutch is engaged throughout the life of the friction clutch. The load exerted by the diaphragm 8 on the thrust plate 7 (clutch engaged) will also be roughly constant in this clutch-engaged position.

The characteristic curve, at the clutch release bearing 83 (the force exerted by the bearing on the end of the fingers 82 as a function of the disengagement travel), will be substantially constant.

The wear take-up device, according to one characteristic, has no ramp means. It is for this reason that the reaction plate 3 is similar to the thrust plate 7.

Thus this plate 3 has at its front a support 23 in the form of a protrusion divided like the protrusion 71. The protrusion 23 has roughly the same mean diameter as the protrusion 71 but is shorter axially than the said protrusion 71. The protrusion 23 extends in axial projection in the direction of the support plate 1. Radially below the protrusion 23, the support plate 1 has a protrusion 24 roughly with the same mean diameter as the primary support 85 and secondary support 84.

The protrusion 24 extends in axial projection in the direction of the reaction plate 3 and the base 90 of the cover 9. The protrusions 23 and 24, just like the protrusion 71, are advantageously divided into annular sectors in order to improve ventilation.

According to the invention, axially acting elastic compensation means 2 bear on the protrusions 23–24. These elastic means 2 act on the reaction plate 3 in the direction of the base 90 of the cover. The elastic means 2 act axially in the opposite direction with respect to the diaphragm 8, that is to say in an opposing fashion.

The elastic compensation means form part of the wear take-up device consist here of a Belleville washer 2 therefore having a similar characteristic curve P2 (FIG. 6) analogous to that P1 of the diaphragm 8.

As a variant, the washer 2 is replaced by a diaphragm allowing passage of air between the plates 1, 3. As a variant, the Belleville washer 2 has holes for the passage of air. The plate 3 is therefore cooled.

For the same deflection, the load exerted by the compensation washer 2 is greater than the load exerted by the diaphragm 8 (FIG. 6).

The wear take-up device also has a release 41 sensitive to the state of wear of the friction linings 11 and, to a lesser extent, to the wear on the reaction plate 3 and thrust plate 7, more precisely sensitive to the wear on the friction faces 21, 31.

The release 41 is located on a diameter greater than that of the elastic compensation means 2.

The release 41 is here controlled by the thrust plate 7, or more precisely by the external periphery of the friction face 21 of the thrust plate. The release 41 is in abutment against the said face 21. The release 41 is here in abutment against the lug 75, that is to say against the face of the lug 75 turned towards the ring 6. The release 41 is therefore in abutment against a radial projection 75 directed outwards, which the thrust plate 7 has at its external periphery. This face is here in the same plane as the face 21. Naturally, as a variant, the said face can be offset axially with respect to the face 21, so that the cover 9 may not completely surround the thrust plate 7.

As a variant, the lug 75 may be shorter circumferentially and the release then bears on a supplementary projection carried by the external periphery of the thrust plate 7 and directed radially outwards.

As a variant the release 41 can come into abutment against the diaphragm 8. This release 41 consists here of a cylindrical spring ring passing through a guidance hole 61 formed in the ring 6 in order to come into contact, through its free end, with the friction face 21 of the thrust plate delimiting the lug 75.

As a variant the spring ring 41, through its free end, can come into contact with the external periphery of the Belleville washer 81.

A reaction stop 21 is therefore provided on one of the parts 7, 8, 9 in order to serve as an abutment for the free end of the release 41. This reaction stop is therefore movable according to the wear notably on the linings 11. It is through this reaction stop 21 that the wear is detected. The stop 41 is therefore a wear detector.

The release 41 cooperates with an axially acting disengagable locking device 4 housed here in a blind hole 5 produced in the lug 35 in the reaction plate 3. The hole 5 is open in the direction of the ring 6.

The disengagable locking device 4 is therefore carried by the reaction plate fixed with respect to rotation and movable axially by virtue of the tongues 32.

It should be noted that the base 51 of the hole 5 forms a control stop for therefore the locking device 4. This stop 51 is fixed with respect to rotation and movable axially.

This device 4 has two coaxial parts 42, 43 in a cylinder/piston relationship defining between them a cavity 44 or variable-volume chamber filled here with grease or any other viscous agent, preferably of high viscosity.

One 42 of the parts 42, 43 is fixed and is engaged, in a complementary fashion, here forcibly, in the hole 5.

This part 42, hereinafter referred to as the cylinder, is hollow and serves as a housing for the movable part 43, herein after referred to as the piston. The cylinder 42 has a shape complementary to that of the blind hole 5. Likewise the piston 43 has a shape complementary to that of the cylinder, the external periphery of the piston 43 being in intimate contact with the internal bore of the cylinder, that is to say with the internal periphery of the cylinder. The piston 43 is movable axially with respect to the cylinder 42.

A sealing joint 45 acts between the internal bore of the cylinder and the external periphery of the piston 43. Here the joint 45 is carried by the piston 43 having, for this purpose, at its external periphery, a groove housing the joint 45, enabling the chamber 44 to be made fluidtight.

In the embodiment, the blind hole 5 is cylindrical in shape with a circular cross section, or as a variant square.

The cylinder 42 and piston 43 therefore have here in cross section a cylindrical shape with a circular cross section, or as a variant square.

As will have been understood, the locking device 4 forms a cartridge mounted through its cylinder 42 in the hole 5.

The movable piston 43 of the cartridge carries the release 41 at its centre and for this purpose has at its centre a bore 46 for guiding the release 41 projecting axially with respect to the piston 43, in the direction of the ring 6 and therefore in the direction of the thrust plate 7.

The bore 46 and hole 61 of the ring 6 coincide axially.

At its front end, directed towards the base 51 and plate 1, the piston 43 carries a support 47 roughly in a U-shape, the base of the U forms a support for a rating and return spring 48, the other end of which bears on a valve 49 associated with the rod 41. For this purpose the bore 46 is broadened at the front at 50 at the front end of the piston 43 in order to form a seat 40 for the valve 49 in the form of a spherical head fixed to the rod 41 whilst being made here in a single piece with the rod 41.

As a variant, the valve 49 can be a ball distinct from the rod 41.

In all cases the valve 49 is able to be manoeuvred by the rod 41.

It is in this front broadened part 50 of the bore 46 that the support 47 and spring 48 are also housed. Here the support 47 has, at the free end of each of its axially oriented arms, a fixing lug 52.

The variable-volume cavity or chamber 44 is delimited on the one hand axially by the piston 43 and the transverse base of the cylinder 42 and on the other hand laterally by the cylindrical skirt of the cylinder 42.

Moreover, in the vicinity of the valve 49, the rod 42 has a helical groove 53. Two transverse channels 54 open out on the one hand internally in the bore 41 in the vicinity of the front end of the reduced-sized portion of the bore 41—that is to say at the level of the seat 40—and on the other hand externally in an annular groove 55 formed at the external periphery of the piston 43.

The groove 53 is an anti-pollution groove and makes it possible to collect grease passing through the groove 53 as described below. The groove 55 is located axially between the joint 45 and the rear end of the piston 43 bearing on the ring 6.

The support 47 is fixed here by crimping its lugs 52 to the piston 43. To do this, the large front part 50 of the bore 46 has, between the front end of the piston 43 and the seat 40, a shoulder, not referenced, serving as a support for the lugs 52. Material on the piston 43, here metallic, is pushed back to form shoulders axially immobilising the lugs 52, as can be seen in FIG. 4.

As a variant the support 42 can be fixed by welding, screwing etc, the support 47 and spring 48 being housed in the piston 43 at the front end thereof hollowed out for this purpose.

The locking device 4 therefore acts axially between the reaction plate 3, axially movable, and a fixed part axially secured to the support plate 1, namely the ring 6. As a variant the locking device 4 can act between the reaction plate 3 and the cover 9, for example the flange 93, 94 thereon.

In all cases the fixed part, such as the ring 6, is offset axially in the direction of the base 90 of the cover 9 with respect to the reaction plate 3.

The wear take-up device 2, 4 with release 41 functions as follows:

In the clutch engaged position, with new friction linings 11, the diaphragm 8 clamps the linings 11 between the thrust plate 7 and reaction plate 3 because the elastic compensation means 2 exert a force greater than that of the diaphragm 8. The tongues 32 and 72 enable the plates 3, 7 to be driven in rotation with axial freedom of movement.

It should be noted that the locking means 4 are latched, that is to say the valve 49 is in abutment on its seat 40. The movement of the reaction plate 3 in the direction of the thrust plate 7, under the action of the compensation means 2 (the Belleville washer 2), is locked because, according to one characteristic, the rear face of the piston 3—furthest away from the reaction plate 3—is in abutment on the ring 6, the cylinder 42 not being able to advance because of the grease contained in the chamber 44 closed by the valve 49.

When the friction linings 11 wear, the reaction plate 3 tends to move in the direction of the thrust plate 3 because the distance between the two plates 7 and 11 decreases with wear.

Figure 5:
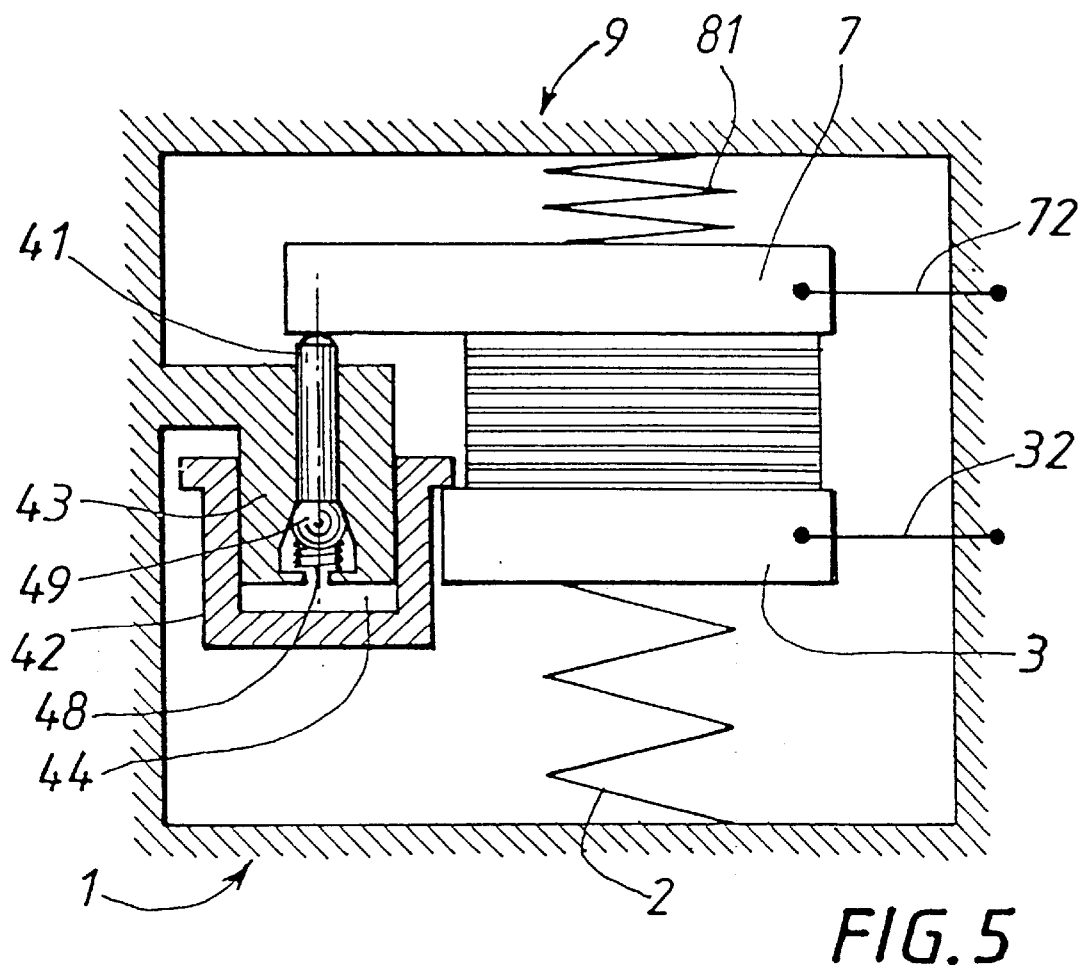
FIG. 5 is a schematic view of the clutch according to the invention.

Nevertheless, the reaction plate cannot move axially because of the locking device 4 then latched as depicted schematically in FIG. 5.

The thrust plate 7 then acts on the release in order to move closer to the reaction plate 3.

The force exerted by the diaphragm 8 on the thrust plate 7 and the release increases because the position of the diaphragm 8 tends to change. As soon as the increase in force is sufficient to overcome the force exerted by the return spring 48 on the valve 49, the said valve leaves its seat 40 so that the cylinder pushed by the plate 3 moves and grease can flow via the groove 53 into the channels 54 as far as the collecting groove 55, without contaminating the friction linings 11, which would impair the torque transmission. The reaction plate 3 moves under the action of the compensation means 2 towards the base 90 of the cover 9 and pushes, by means of the linings 11 acting as shims, the thrust plate 7 towards the base 90 of the cover 9. The spring ring 41 (the release) follows this movement so that the valve 49 closes again. This is effected continuously, in a reliable and certain fashion, without any risk of jamming because of the absence of ramp means facilitating the manufacture of the reaction plate 3 and support plate 1.

In all cases the valve 49 closes again when disengaging, the release 41 no longer being subjected to the action of the thrust plate so that the spring 48 closes the valve again.

This plate 1 can be replaced with a less thick disc carrying the flange 22 at its external periphery.

In general terms the clutch therefore has a support 1, such as a support plate, transversely oriented, formed so as to be connected to the first shaft, the support 1 being annular in shape.

The engagement means 81, here the diaphragm, cannot axially move the reaction plate 3, via the linings and the thrust plate 7, in the direction of the support 1, because of the greater reaction exerted by the elastic compensation means. The linings 11 can therefore be clamped normally between the faces 21, 31, since the reaction plate 3 cannot move normally in the direction of the thrust plate 7 because of the presence of the locking device 4 and because the piston 43 is in abutment, through its rear end, against the axially fixed ring 6 or another fixed part such as a portion of the cover 9.

In the case of wear the release 41 (the rod) moves whilst being axially guided by the ring 6 (the hole 61) and by the bore in the piston 43. The valve opens so that the reaction plate 3 moves towards the base 90 or to compensate for the wear.

The thrust plate 7 therefore occupies roughly the same position when the clutch is engaged: the same applies to the engagement and disengagement means. These, as mentioned above, can consist of one or more Belleville washers in series and associated with a false diagram, as can be seen in the document FR-A-2 753 756 filed on Sep. 6, 1996 and as mentioned above. As a variant, use is made of a mounting in series of a positive washer and a negative Belleville washer, as described in the application WO 97/19275.

The elastic compensation means 2 can include in this case two Belleville washers mounted in series with the interposing for example of a spring ring, such as the spring ring 9 in the aforementioned document, between the contact areas of the two Belleville washers.

As a variant the engagement means can include a coil spring, tapered in shape, acting between the cover and the clutch release bearing, able to act therefore as disengagement levers.

The elastic compensation means can consist of a tapered coil spring.

In general terms the elastic compensation means are of a form similar to that of the engagement means so as to have the same shape of characteristic curve as these, but with a greater force for the same deflection (see FIG. 6).

The locking device 4 has two coaxial parts, movable with respect to each other, one of which carries the release 41, and able to move axially in a single direction, with respect to each other, disengagably under the action of the rod 41 (the release). For this purpose it is possible to adopt the arrangements described in the document FR-A-2 426 834 FIGS. 4, 5, 8 and 9, knowing that it is the reaction plate 3 which carries the locking device. The hole 5 is not necessarily blind.

As a variant, as depicted schematically in FIG. 5, the cylinder 42 has at its rear end a collar 142 in abutment against the rear face of the reaction plate 3 (the lug 35 thereon) turned towards the thrust plate 7 in order to form a control stop and move the cylinder 42 in the direction of the base 90.

The reaction plate 3 is in two parts 130, 131 as a variant (FIG. 7), namely a support part 131 and the reaction plate 130 proper. A piece 143 is mounted fixedly in the lug 34 and carries the valve 49, the support 47.

This piece 143 is in the image of the piston 43 in FIGS. 1 to 4 and therefore has a bore 46 with a front part 50 housing the support 47, fixed by crimping, the rating spring 48 and the valve 49 spherical in shape and fixed to the rod 41 provided with a groove 153 opening out into a collecting chamber 155 at the rear of this valve-carrying piece 143. The piston is in reality created by the assembly consisting of reaction plate 130 and piece 143.

The cylinder is formed by the flange 22, the support 1 and the support piece 131 fixed by riveting to the plate 1, radially above the screws 12. The plate 130 is provided with a transverse channel 154 opening out internally in a chamber 255 delimited by the plate 3 and piece 131. The plate 130 is connected with respect to rotation to the support plate 1 in the same way as in FIGS. 1 to 4, the compensation spring being identical.

The grease in the chamber 255 prevents a movement of the plate 130 under the action of the washer 2. In the event of wear the valve 49 opens and the grease is discharged into the chamber 155 closed off by a metallic plug 156. The plate 130 then moves in order to compensate for the wear on the linings. The valve 49 then closes during the disengagement operation under the action of the spring 48 rated accordingly. In this case there is no need of a ring 6.

The piece 131 is annular and has, at its axial ends, respectively a fixing flange directed radially towards the inside for fixing the piece 131 to the support 1 by means of rivets, screws or other devices, the said flange being in contact with the support 1, and a flange directed radially outwards for axially delimiting the chamber 255, delimited radially by the plate 130 and the piece 131.

Naturally sealing joints depicted in dark in FIG. 7 are provided, along with a plug for closing off the channel 154.

The reaction stop, as mentioned previously, is not necessarily formed by the lug 75 but by another projection on the thrust plate 7 or by the diaphragm 8.

The means of connecting with respect to rotation 32 and 72 can, as mentioned previously, be of the mortise and tenon type.

The clutch can have several friction discs and several thrust plates.

In general terms, in order to have good movement of the reaction plate 3, a locking device 4 is here provided by lugs 35 on the reaction plate 3.

This depends on the application.

Two diametrically opposed devices 4 can be provided. In general terms it is sought to have a regular circumferential distribution of the locking devices in order to balance the reaction plate 3 and prevent any jamming of the releases 4.

The locking device 4 is carried in general terms by a radial projection directed towards the outside, which the reaction plate has at its external periphery just like the thrust plate 7. This projection is in the figures the lug 35, but as a variant can consist of an additional lug, the lug 35 being shortened circumferentially.

As a variant the structures can be reversed. The projections on the thrust plate 7 and reaction plate 3 then extending at the internal periphery of the said plates whilst being directing radially inwards and distinct from the lugs 35, 75.

Naturally the protrusions 71, 23, 24, forming annular supports, can be replaced by spring rings or any other bead.

Naturally the clutch can be of the pulled type, the external periphery of the Belleville washer 81 then bearing on the cover, whilst the internal periphery of the said Belleville washer is then in abutment on protrusion on the thrust plate.

As is clear from the description and drawings, the chamber 44 has a variable volume, the volume of this chamber decreasing with the wear with transfer of grease in the channels 54 and groove 55.

Naturally the tongues, 72, 32 exert a negligible return force compared with the springs 8, 2 (the engagement compensation means).

Axially acting elastic progressive-action means are usually provided between the linings 11. Account has not been taken of these, here for reasons of simplicity. Nevertheless, when the clutch is engaged, these means exert on the reaction plate 3 a force less than that exerted by the compensation means 2 in order to prevent the taking up of wear.

In this position the progressive-action means are crushed completely or partially by the engagement means 81.

Naturally, the support 1 can be shaped at its internal periphery so as to be fixed to the first shaft indirectly.

Figure 10:
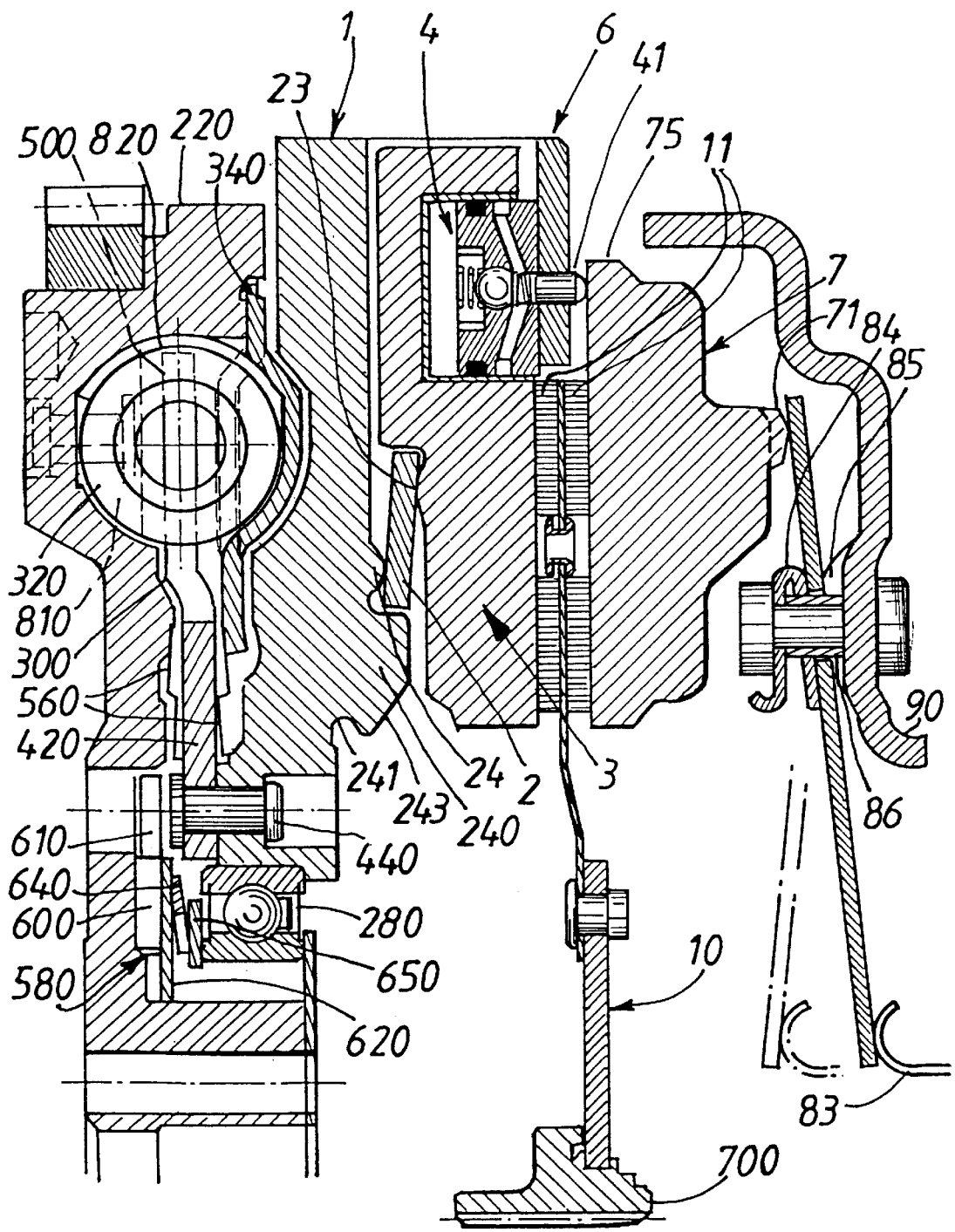
FIG. 10 is a half view in axial section to a larger scale of the friction clutch of FIG. 9.

Thus, in FIGS. 9 and 10, the support 1 in the form of a plate has an internal bore shouldered for mounting a bearing 280 carried by the hub 180 on a first mass 120 intended to be fixed to the end of the internal combustion engine crankshaft. The first mass 120 is fixed to the crankshaft of the internal combustion engine by means of screws 100.

The support 1 carries fixedly a disc 420 coupled elastically to the first mass by circumferentially acting elastic members 320 as described in the document FR-A-2 729 199, to which reference should be made for more information.

Thus the flywheel according to the invention, with the wear take-up device with elastic compensation means 2 and locking device associated with the release 41, form part of a double torsion damping flywheel having two coaxial masses 120, 1, 2, 3, 4, 41, with an axial symmetry and rotation axis X-X, mounted so as to be able to move angularly with respect to each other counter to circumferentially acting elastic members 320.

The second mass includes the support plate 1 of the reaction plate 3 and is rotatably mounted on the hub 180 of the first mass 120, hereby means of a ball bearing 280 acting radially between the external periphery of the hub 180 and the internal periphery of the support plate 1 formed by means of the central internal bore of the plate 1.

The first mass 120 includes a plate 200 which has at its internal periphery, in a single piece, the central hub 180 and at its external periphery an axially oriented annular skirt 220.

The plate 200, the hub 180 and the skirt 220, all in the single piece, are made from castable material, here cast iron.

The first mass 120 is fixed to the crankshaft by means of screws 100 passing through the hub 18 and located below the ball bearing 280. The second mass includes the support plate 1 and is intended to be rotatably connected in a disengagable manner to the second shaft, namely here the input shaft of the gearbox, by means of the friction disc 10, as mentioned previously.

The first mass delimits, to a major extent, a chamber 300 which can be filled with a viscous agent in which are housed the circumferentially acting elastic members 320, here in the form of coil springs of curved shape, here precurved.

The first mass 120 is shaped, by virtue of its skirt 220, in order to radially hold, directly or indirectly, the elastic members 220 arranged in a ring. The skirt 220 is hollowed out internally in order to have a cavity for retaining the elastic members 320. Here a spout 820 is deposited in the cavity and is therefore interposed radially between the internal periphery of the skirt 220 and the external periphery of the members 320 in order to reduce wear. The spout is here made of high-hardness steel. The chamber 300 is delimited to a major extent by the plate 200, the skirt 220 and a disc 340 fixed here by crimping to the skirt 220.

The disc 340 is dished locally opposite inserts 810, fixed by riveting to the plate 200, and then abutment of the ends of the elastic members 320 of great length circumferentially.

The plate 200 is hollowed out and the disc 340 is curved in order to define an annular channel for the elastic members 320.

An internal disc 420 is fixed by rivets 440 to the support plate 1, hollowed out opposite the disc 340 adjacent to the plate 1 in order to reduce the axial bulk. The external edge of the disc 42 has radial lugs 500 opposite inserts 810 and supports for the disc 340 in order to serve as an abutment for the circumferential ends of the springs 320. The lugs 50 extend between the inserts 810 and the supports for the disc 340.

The lugs 500 enter a chamber closed internally by two sealing washers 560 disposed on each side of the disc 420.

The washers 560 are elastic and metallic and are fixed by means of rivets 440 to the disc 420.

Externally, the washers 560 are in abutment against a projecting surface of the plate 200 and against the internal periphery of the disc 340.

The washers 560 close off the chamber 300 at its internal periphery. The chamber 300 is here filled partially with grease and lubricates the elastic members 320 here extending each over a little less than 180°, so that two lugs 500, two inserts 810 and two diametrically opposed dishes are provided. Finally, a friction device 580 is provided at the centre.

This device is mounted on the hub 180 axially between the plate 200 offering a friction face and a ring 650 serving for the axial wedging of the inner ring of the bearing 280 fitted on the hub 180. A support washer for the heads of the fixing screws 100 also serves for the axial w edging of the said internal ring.

Rivets 660 each have a head 680 in the form of a stud entering a scallop 610 in a friction washer 600 inserted axially between the plate 200 and a metallic application washer 620 fixed with respect to rotation to the hub by means of internal lugs (not referenced) entering axial grooves (not referenced) in the hub 18.

The rivets 660 serve for fixing sealing washers 560 to the internal disc 420. A sub-assembly consisting of a disc 420 and washer 560 is thus formed. Finally riveting to the support 1 by means of rivets 440 is effected. An axially acting elastic washer, here a Belleville washer 640, is interposed axially between the ring and the washer 620 for axial clamping of the friction washer 600 between the plate 200 and the application washer 620 movable axially with respect to the hub 180 but fixed with respect to rotation by virtue of the connection in rotation effected by means of internal lugs on the washer 620 engaged in the axial grooves in the hub 180. The studs 680 rotatably drive the washer 600, here made from synthetic material.

During a relative angular movement between the first mass 120 and the plate 1, the elastic members 320 are compressed by the relative movement of the lugs 500 with respect to the inserts 810 and disc 340.

At the same time, the was her 600 is driven by the studs 680. This washer rubs against the plate 200 and the washer 620, the studs 680 meshing with the scallops 610.

It will be noted that, below the protrusion 24 for supporting the compensation Belleville washer 2, the support 1 has a ring 240 projecting axially and provided at its internal periphery with the groove 241 for collecting oil or grease escaping from the bearing 280 or from the crankshaft.

This plate 1 is therefore stiffened at its internal periphery by virtue of the ring 240 the protrusion 24 extending radially below the hollow produced in the plate 1 for curving the disc 340.

The groove 241 advantageously opens out in the ventilation holes 242 produced in the plate 1.

The ring 240 is bevelled at 243, at its base opposite a bevel which the thrust plate 3 has at its internal periphery. The bevel 243 is connected to the groove 241.

Thus the disc 10 is protected and a funnel is formed between the plate 3 and the ring 240 of the reaction plate, assisting ventilation between the two plates 1,3. It should be noted that the bearing 280 is thus less hot than that in the document FR-A-2 729 199 because the reaction plate 3 is connected to the bearing 280 by the support plate 1 with the intervention according to the invention of the elastic compensation means 2 between the two plates 1, 3 separated from each other.

When the washer 2 has holes or is replaced by a diaphragm, good ventilation is achieved between the two plates 1, 3. This is applicable to the embodiment in FIGS. 1 to 8.

Figure 11:
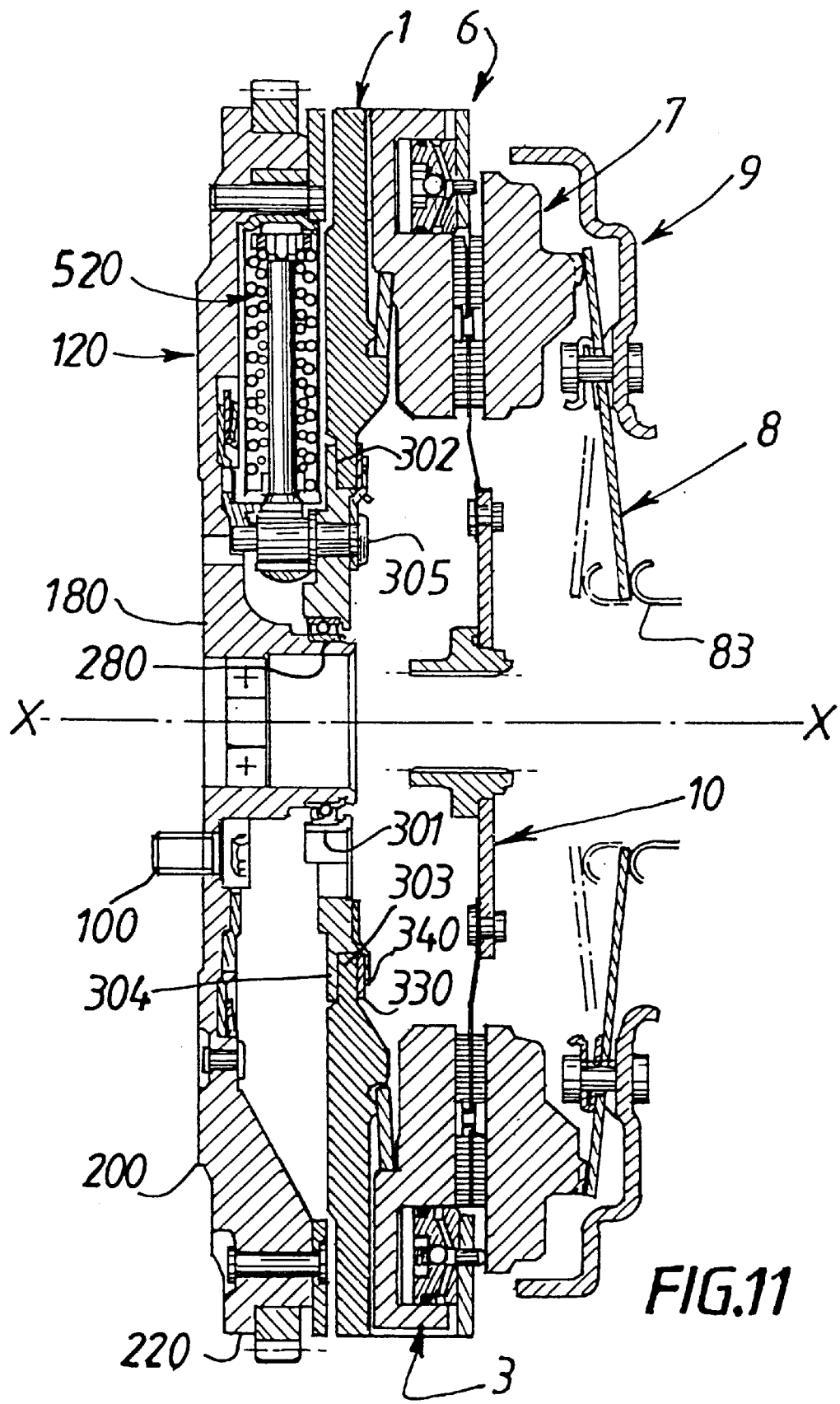
FIG. 11 is a view in axial section of a friction clutch according to the invention equipped with a double torsion damping flywheel with radially acting elastic members.
Figure 12:
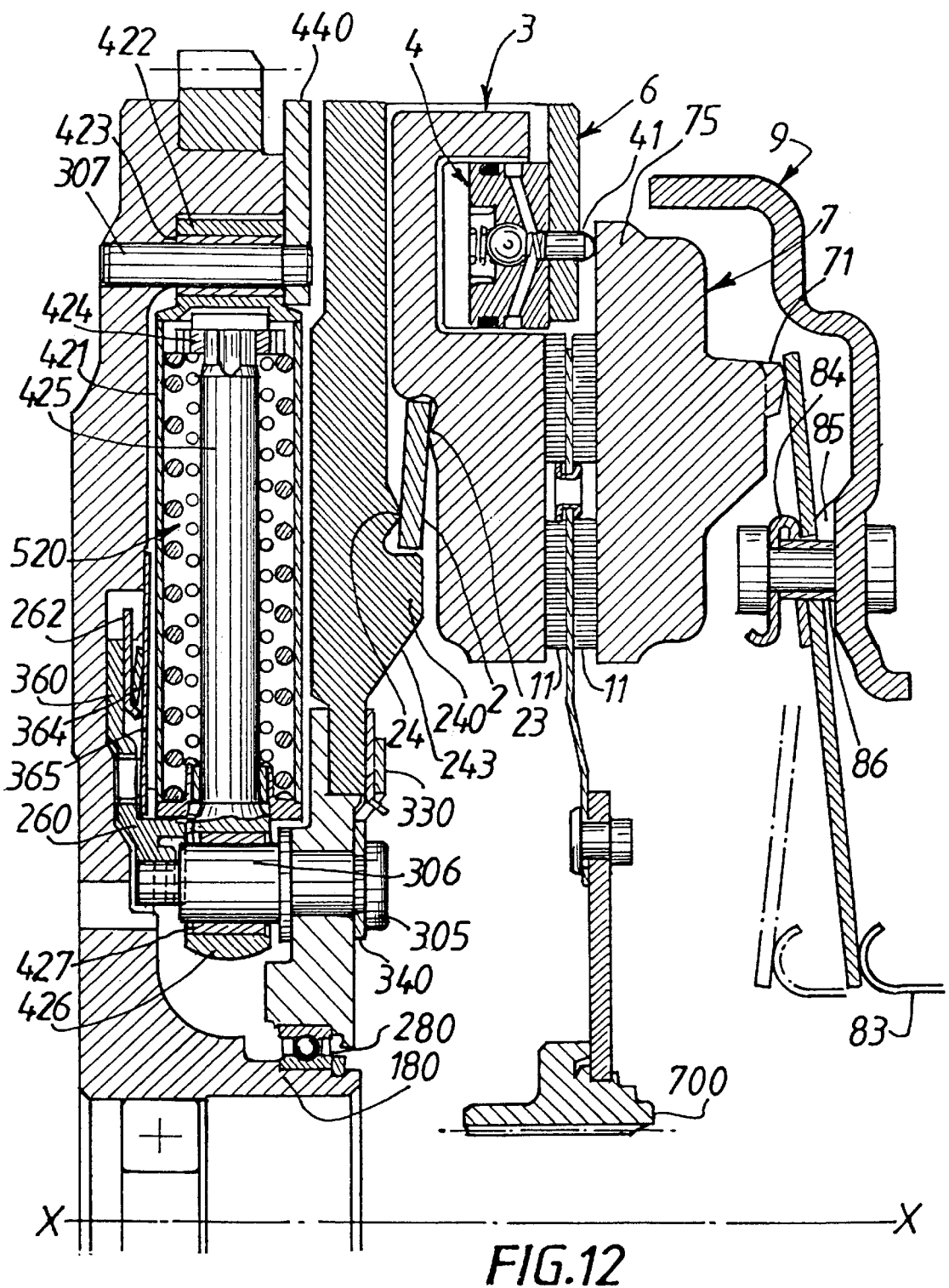
FIG. 12 is a half view in axial section to a larger scale of the friction clutch of FIG. 11.

As a variant, FIGS. 11 to 12, the support plate 1 still forms part of the second mass of a torsion damping flywheel as in FIGS. 9 and 10.

As in FIGS. 9 and 10, the plate 1 has a ring 240 radially below the support protrusion 24 of the elastic compensation means 2.

The ring 240 stiffens the support 1 in all cases.

In FIGS. 11 and 12, a funnel is formed between the ring 240 and the reaction plate 3 as in FIG. 9, but the ring 240 has no groove at its internal periphery. Advantageously, the elastic compensation means 2 have holes for the passage of air between the plates 1 and 3 and ventilation.

A second hub 300 has a shouldered internal bore for mounting the ball bearing 280, the first mass 120 having a plate 200 in a single piece at its external periphery with an axially oriented annular skirt 220. The hub 300 is made from heated steel and can form as a variant the external ring of the bearing 280. The second hub 300 is therefore rotatably mounted on the hub 180, referred to as the first hub, here by means of the ball bearing 280.

The hub 300 has a hole at 301 for the passage of at least one tool for accessing the fixing screw 100 for the first mass 120 or engine crankshaft. The fixing screws are therefore located here radially above the ball bearing 280 of reduced size. The holes 301 allow ventilation of the support plate 1.

The second hub 300 has at its external periphery a groove 302 as described in the document FR-A-2 749 904, to which reference should be made for more information. This groove 302 is delimited by an axially oriented cylindrical base allowing centring of the internal periphery in the form of a disc 303 of the support plate 1. More precisely, the internal bore of the disc 303 is in intimate contact with the base of the groove. The lateral faces of the disc 303 are in contact respectively with a web 304 of the hub 300, forming one of the sides of the groove 302, and with a friction washer 330 forming the other side of the groove. The washer 330 is subjected to the action of an axially acting elastic washer 340 fixed with respect to rotation to the hub 300. The elastic washer has at its internal periphery a transversely oriented part in which there are formed anchoring holes, through which there pass rivets 305 passing through the hub 300 in order to form pivots 306 between the plates 200, 1. The external periphery of the washer 340 is frustoconical in shape and is connected by a fold to its transverse part. Holes, not referenced, are produced in the fold. Folded lugs (not referenced) issuing from the internal periphery of the friction washer 330 enter the holes. The washer 330 is thus connected with respect to rotation to the elastic washer with the possibility of axial movement.

Thus, in this embodiment, the second mass of the double torsion damping flywheel has a torque limiter with the support 1 mounted by means of its internal disc 303 in the groove 302 in the central hub 300 with controlled clamping of the disc 303 between the web 304 and the friction washer 330 subjected to the action of the elastic washer 340.

In the event of excessive torque, notably on stopping and starting of the vehicle engine when, in a known fashion, passing through the resonant frequency, the support 1 slips with respect to the hub 300 and therefore moves with respect to it. The slip absorbs the excess torque. Under normal conditions, no relative movement occurs between the hub 300 and the support 1. Thus the support 1 is mounted so as to rotate in a controlled fashion on the second hub 300, the base of the groove 302 forming a centring surface.

The plate 200 of the first mass carries at its external periphery pivots 307 in the form of pins fitted in the plate 200 and in an external disc 440 fixed by riveting to the skirt 220.

The pivots 306, 307 allow the mounting of radially acting elastic members 520.

These members 520 are compression springs and form parts of cartridges each comprising a cylinder 421 with an upper articulation head 422 provided with a bearing 423 mounted on a pivot 307. A piston 424 is mounted inside the cylinder 421. The piston 424 is fixed to the rod 425 having at its internal periphery a lower articulation head 426, carrying a bearing 427 mounted on a lower pivot 306.

The bottom part of the cylinder is closed off by a washer 428 through which the rod 425 passes.

The elastic members 520, here concentric helical springs, therefore bear at their internal periphery on the washer 428 fixed to the cylinder 421 mounted so as to articulate through the pivots 307 on the first mass 120 and at their external periphery on the piston 424 mounted so as to articulate, through its rod 425 with head 426, on the pivots 306 of the second hub 300.

During a relative movement between the two masses of the double flywheel, the springs are compressed, the rods 425 emerging from the cylinder 421.

At least some pivots 306 have an end stud 308 which meshes with a friction washer 260, the studs 308 entering for this purpose the openings of complementary shape in the washer 260. The washer 260 rubs permanently against the plate 200 and drives in rotation, after the take-up of an angular clearance, a second washer 360 gripped between the plate 200 and an application washer 262 with external radial lugs (not referenced) entering grooves (not referenced) formed in a thicker part of the plate 200. The washer 262 is subjected to the action of an axially acting elastic washer, here a Belleville washer 364, bearing on a closure washer 365 fixed by riveting to the plate. The washer 360 has lugs at its internal periphery entering a circumferential clearance in scallops which the washer 260 has at its external periphery. The washer 365 is elastic and forces the washer 260 towards the plate 200.

The washer 360 therefore acts in a deferred fashion. The double flywheel therefore operates like the one in the document FR-A-2 749 904, with radially acting elastic members 520 mounted so as to be articulated at the external periphery of the first mass and articulated at the internal periphery of the second mass.

The friction device is therefore here located between the springs 420 and the plate 200 above the bearing 280.

Naturally, it is possible to combine the different figures together.

Thus a torque limiter of the type in FIGS. 11 and 12 can replace the support plate 1 in FIGS. 9 and 10 and vice versa.

In FIGS. 9 to 12, the friction disc is of course rigid and its hub coupled rigidly to the linings 11 can be seen at 700.

In FIGS. 11 and 12, a control bearing, not referenced, is mounted in the hub 180 in order to support the end of the second shaft.

In the figures, the elastic means 2 include a Belleville washer or a diaphragm. The elastic means 2 therefore have at least one Belleville washer, knowing that a diaphragm has a Belleville washer at its external periphery.

I claim:

1. Friction clutch, notably for motor vehicles, having a support (1) formed so as to be fixed to a first shaft, a reaction plate (3) connected rotatably to a support (1) by second means of connecting with respect to rotation (32) allowing axial movement of the reaction plate (3) with respect to the support (1), a first friction face (31) provided on a rear face of the reaction plate (3) turned in the opposite direction to the support (1), at least one friction disc (10) shaped so as to be connected rotatably to a second shaft and provided at its external periphery with friction linings (11), a cover (9) provided with a transversely oriented base (90) and with a central hole, fixing means (77, 78) for fixing the cover (9) to the support (1), a thrust plate (7) rotatably connected to the cover (9) by first means of connecting with respect to rotation allowing an axial movement of the thrust plate (7) with respect to the cover (9), a second friction face (21) provided on a front face of the thrust plate (7) turned towards the first friction face (31), engagement means (81) bearing on the base (90) of the cover (9) and on the rear face of thrust plate (7) turned towards the base (90) of the cover (9) for clamping the friction linings (11) between the first (21) and second (31) friction faces, disengagement mean (82) associated with the engagement means (81) for releasing the clamping action thereof, a wear take-up device (2, 4) for compensating at least for the wear on the friction linings (11), a release (41) subjected to the action of one of the thrust plate (7)—engagement means (81)—disengagement means (82) elements in order to control the actuation of the wear take-up device (2, 4), wherein the wear take-up device (2, 4) has on the one hand axially acting elastic compensation means (2) acting between the support (1) and the reaction plate (3) and on the other hand an axially acting disengagable locking device (4) carried by the reaction plate (3), in that the release (41) acts on the locking device (4) in order, in the event of wear on the friction linings (11), to disengage the said locking device and allow an axial movement of the reaction plate (3) in the direction of the thrust plate (7) in order to compensate for the said wear and in that the elastic compensation means (2) exert a force on the reaction plate (3) greater than the force exerted by the engagement means (81) on the thrust plate (7).

2. Clutch according to claim 1, wherein the elastic compensation means (2) have a characteristic curve similar to that of the engagement means.

3. Clutch according to claim 2, wherein the elastic compensation means (2) and the engagement means (81) have at least one Belleville washer.

4. Clutch according to claim 1, wherein the elastic compensation means (2) include a Belleville washer, and in that the engagement means (81) consist of a diaphragm (2) having a peripheral part (81) in the form of a Belleville washer extended radially inwards by a central part divided into radial fingers (82) by slots in order to form disengagement means (82).

5. Clutch according to claim 1, wherein the elastic compensation means (2) bear at their internal periphery on the support (1) roughly over a mean diameter equal to the mean bearing diameter of the engagement means (81) on the base (90) of the cover (9).

6. Clutch according to claim 5, wherein the elastic compensation means (2) bear on the rear face of the reaction plate (3) over a mean diameter approximately equal to the mean bearing diameter of the engagement means (81) on the thrust plate (7).

7. Clutch according to claim 1, wherein the release is able to cooperate with a radial projection (75) which the thrust plate (7) has at one of its external and internal peripheries.

8. Clutch according to claim 7, wherein the projection consists of a lug (75) on the thrust plate serving for fixing a set of elastic tongue or tongues (72) forming part of the first means of connecting in rotation, the lug (75) extending in radial projection towards the outside at the external periphery of the thrust plate (7).

9. Clutch according to claim 8, wherein the reaction plate (3) is in the image of the thrust plate (7) and has at one of its external and internal peripheries a radial projection (35) for carrying the locking device (1).

10. Clutch according to claim 9, wherein the projection (35) is directed radially outwards whilst being located at the external periphery of the reaction plate (3) and in that the projection (35) is a lug (35) on the reaction plate (3) serving for fixing a set of elastic (32) tongue or tongues (35) forming part of the second means of connecting in rotation.

11. Clutch according to claim 10 wherein the locking device has two coaxial pieces (42, 43), one of which (43) carries the release (41), and in that one of the pieces is able to come into abutment on a piece fixed to the support (1).

12. Clutch according to claim 11, wherein the piece (43) carrying the release is able to come into abutment, through its rear part directed in the opposite direction to the support (1), against the piece fixed to the support (1).

13. Clutch according to claim 12, wherein the other piece (42) of the locking device (4) is carried by the projection (35) on the reaction plate (3).

14. Clutch according to claim 11, wherein the locking device has two pieces (42, 43) in cylinder/piston relationship delimiting in it a variable-volume chamber filled with grease.

15. Clutch according to claim 14, wherein the locking device (4) has a cylinder (42) mounted in a hole in the projection (35) on the reaction plate (3) and a piston (43) carrying the release (41) at its centre.

16. Clutch according to claim 15, wherein the release (41) consists of a rod (41) guided by a bore (46) formed in the piston (43).

17. Clutch according to claim 16, wherein the bore (46) in the piston (43) has a broadened front part (50) turned towards the support (1) and in that the said front part (50) forms a seat (40) for a valve (49) able to be manoeuvred by the rod (41) constituting the release.

18. Clutch according to claim 17, wherein the front part of the piston (50) serves as a housing for a rating spring (48) bearing on the valve (49) and on a support (47) fixed to the piston (43).

19. Clutch according to claim 18, wherein the rod (41) has, in the vicinity of the valve (49), a helical spring (43), and in that the piston (43) has transverse channels (54) opening out in the said groove (53) and in a collecting groove (55) located at the external periphery of the piston (43).

20. Clutch according to claim 17, wherein the valve (49) has a spherical shape and is made in one piece with the rod (41).

21. Clutch according to claim 12, wherein the piece fixed to the support (1) is a ring (6) fixed to the free end of an axially oriented annular peripheral flange (22) carried by the support (1) and in that the release passes through the said ring (1) so that a sub-assembly is formed, including the support (1), the reaction plate (3) and the wear take-up device.

22. Clutch according to claim 21, wherein the support (1) forms part of a second mass of a double portion damping flywheel, the said mass being connected by elastic members (320, 420) to a first mass (120) intended to be fixed to the first shaft.

23. Clutch according to claim 22, wherein the first mass (120) has a hub (180) at its internal periphery, and in that the support (1) is rotatably mounted on the hub (180) of the first mass (120).

24. Clutch according to claim 21, wherein the first mass (120) has a first hub (180) at its internal periphery, in that the second mass has a second hub (300) rotatably mounted on the first hub (180) and in that the support (1) is mounted on the second hub (300) with the formation of a torque limiter between the second hub (300) and the support (1).

* * * * *